W. B. KING.
PLANTER ATTACHMENT.
APPLICATION FILED MAR. 7, 1914.
1,174,991.
Patented Mar. 14, 1916.
2 SHEETS—SHEET 1.
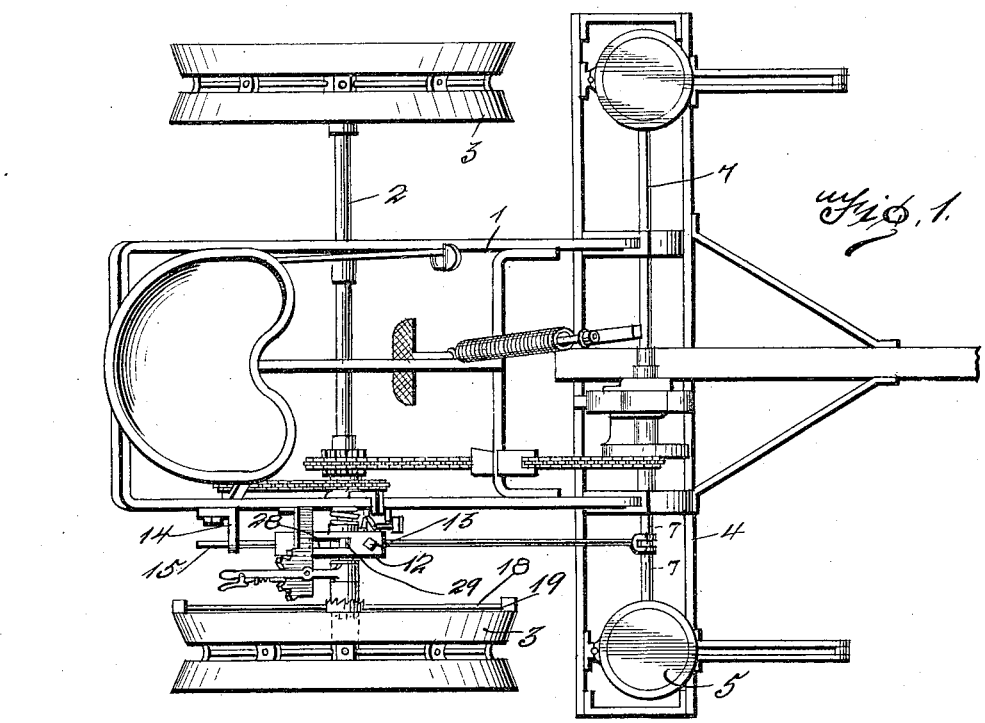
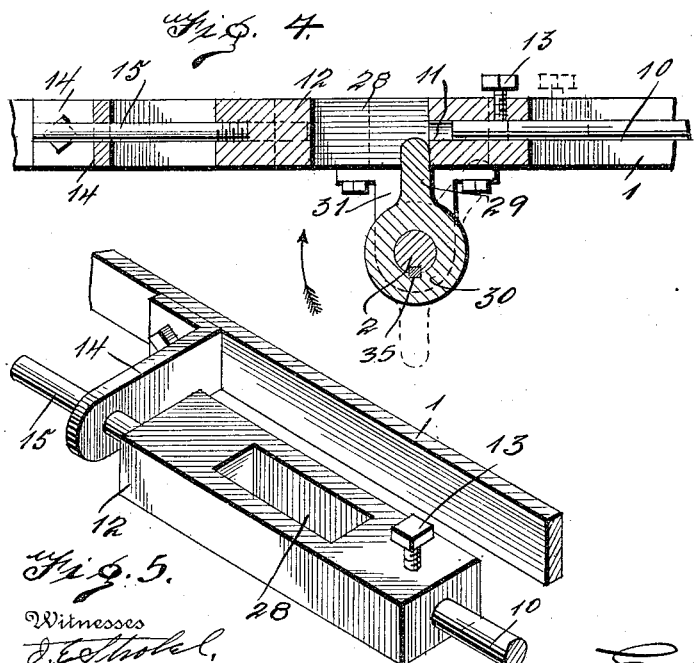
Inventor
Wesley B. King

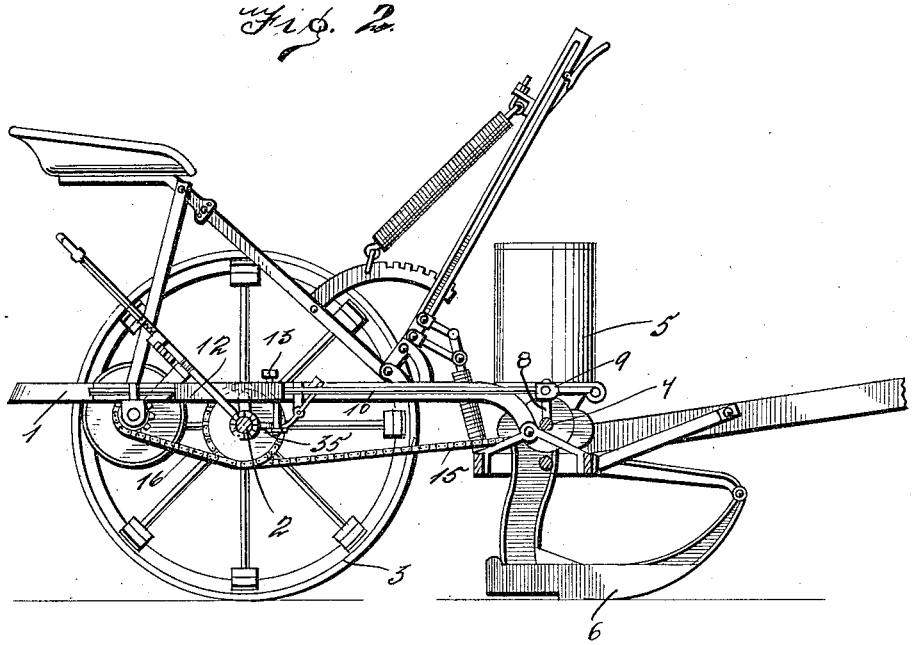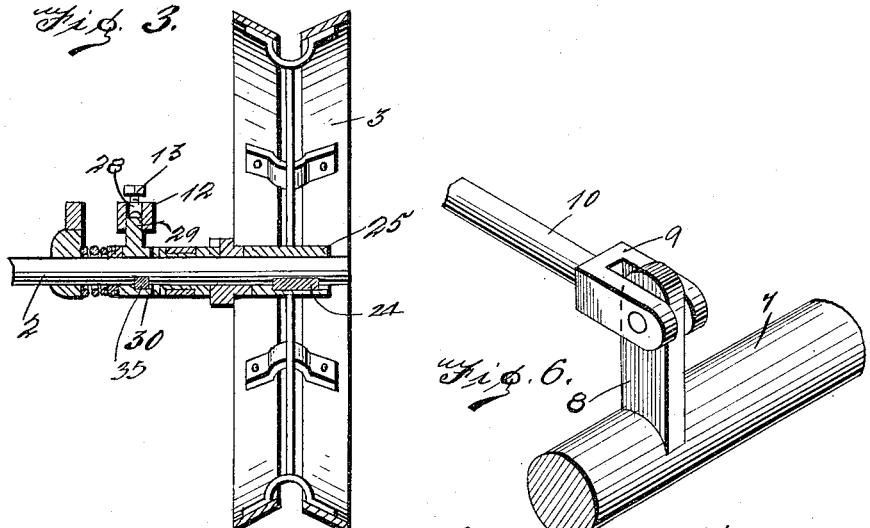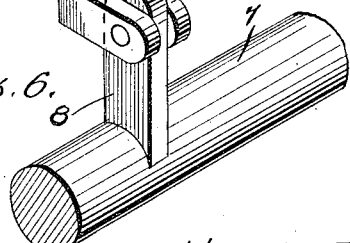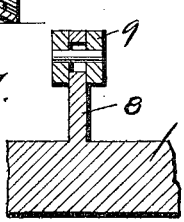

UNITED STATES PATENT OFFICE.

WESLEY B. KING, OF LEASBURG, MISSOURI.

PLANTER ATTACHMENT.

1,174,991.  Specification of Letters Patent.  Patented Mar. 14, 1916.

Application filed March 7, 1914. Serial No. 823,132.

*To all whom it may concern:*

Be it known that I, WESLEY B. KING, a citizen of the United States of America, residing at Leasburg, in the county of Crawford and State of Missouri, have invented certain new and useful Improvements in Planter Attachments, of which the following is a specification, reference being had therein to the accompanying drawing.

This invention relates to planter attachments and has especially for its object the production of a simple and efficient planter attachment whereby the ordinary check wire may be eliminated.

Another object of this invention is the production of a simple and efficient check mechanism which is carried directly by the machine so as to efficiently drop the seed from the planter at predetermined distances so as to allow the grain or seed to be planted in equal or parallel rows.

With these and other objects in view this invention consists of certain novel combinations, constructions, and arrangements of parts as will be hereinafter fully described and claimed.

In the accompanying drawings: Figure 1 is a top plan view of the machine. Fig. 2 is a side elevation thereof. Fig. 3 is an enlarged longitudinal section through one end of the rear axle which supports the clutch mechanism. Fig. 4 is a longitudinal section through the tripping mechanism. Fig. 5 is a detail perspective view of the tripping block. Fig. 6 is a detail perspective view showing the manner in which the tripping rod is connected to the shaft for delivering grain or seed from the grain or seed hoppers. Fig. 7 is a section taken on the line 7—7 of Fig. 1.

By referring to the drawings it will be seen that 1 designates the frame which is supported upon the axle 2, which axle is carried by the wheels 3. An auxiliary frame 4 is carried at the front end of the frame 1, and upon this auxiliary frame 4 is mounted a plurality of side hoppers 5. These side hoppers 5 are of the usual construction, and the ordinary drill shoes 6 are also employed in connection therewith. A shaft 7 extends longitudinally of the auxiliary frame 4 and coöperates with the side hoppers for delivering seed or grain therefrom as the shaft 7 is oscillated. The shaft 7 is provided near one end thereof with an upwardly extending finger 8 to which finger is pivotally connected the bifurcated end 9 of the trip rod 10. This trip rod 10 has its rear end adjustably mounted in the socket 11 formed in the tripping block 12. The rear end of the trip rod 10 is held within the socket 11 by means of the clamping screw 13 as is clearly illustrated in Fig. 4. It should be understood that this rod 10 may be held in an adjusted position within the socket 11 by moving the rod 10 to any desired position within the socket 11 as above mentioned. A bracket 14 is carried near the rear end of the frame 1 and through this bracket 14 passes the auxiliary rod 15 of the trip rod 10. This auxiliary rod 15 has its forward end securely fastened to the rear end of the tripping block 12 as is illustrated in Fig. 4.

The tripping block 12 is provided with a longitudinally extending slot 28, within which slot works the projecting pin 29 of the collar 30 carried by the axle 2. It will be seen that as the collar 30 is keyed to the axle 2 as shown at 25 in Figs. 3 and 4, while the hub 25 of one of the wheels 3 is keyed to the axle as shown at 24, rotary motion will be imparted to the collar 30 as the wheels rotate. Therefore, the rotation of the collar 30 will cause the finger 29 to swing in a circle whereby the finger will cause the tripping block 12 to reciprocate and thereby oscillate the shaft 7 as above described by reciprocating the rod 10. The axle 2 is suspended below the frame 1 by means of the brackets 31.

It should be understood that a very simple and efficient device has been produced which may be attached to the ordinary planter now in use and that the ordinary check wire which has been previously necessary in many instances has been entirely eliminated by the substitution of the trip rod and mechanism for operating the same as previously described.

Having thus described the invention what is claimed as new, is:—

1. A device of the class described comprising a frame, seeding devices carried thereby, an operating shaft, a trip rod connected to said operating shaft, a trip block provided with a longitudinally extending slot, an axle supporting said frame, and means carried by said axle and working in said longitudinally extending slot to cause said trip rod to reciprocate and cause said seeding mechanism to discharge seed therefrom at predetermined times.

2. A device of the class described comprising a frame, a plurality of seed discharge devices, an axle supporting said frame, a sleeve keyed upon said axle, a finger carried by said sleeve, a trip rod, a shaft for operating said seed discharge devices, said trip rod connected to said shaft, a tripping block having a socket, said rod extending into said socket, means for holding said block in an adjusted set position upon said rod, said tripping block provided with a longitudinally extending slot, a finger carried by said sleeve and working in said slot for reciprocating said trip rod as said axle is rotated.

3. In a device of the class described, the combination of a frame, means for supporting said frame, an oscillating shaft carried by said frame, said shaft being adapted to operate seed hoppers, a finger carried by said shaft, a rod engaging said finger, a tripping block secured to said rod, means for reciprocating said tripping block, a bracket carried by said frame, an auxiliary rod slidably mounted upon said bracket and engaging said tripping block whereby said tripping block and first-mentioned rod will be efficiently supported adjacent their rear ends.

In testimony whereof I hereunto affix my signature in presence of two witnesses.

WESLEY B. KING.

Witnesses:
E. L. WEST,
J. A. DORRILL.

Copies of this patent may be obtained for five cents each, by addressing the "Commissioner of Patents, Washington, D. C."